(12) United States Patent
Furuhata (10) Patent No.: US 6,773,252 B2
(45) Date of Patent: Aug. 10, 2004

(54) PRESS MOLDING APPARATUS

(75) Inventor: Isamu Furuhata, Nagano-ken (JP)

(73) Assignee: Kiso Kogyo Kabushiki Kaisha, Nagano-ken (JP)

( * ) Notice: Subject to any disclaimer, the term of this patent is extended or adjusted under 35 U.S.C. 154(b) by 117 days.

(21) Appl. No.: 10/011,735

(22) Filed: Dec. 11, 2001

(65) Prior Publication Data

US 2002/0071882 A1 Jun. 13, 2002

(30) Foreign Application Priority Data

Dec. 11, 2000 (JP) ........................................ 2000-376552

(51) Int. Cl.[7] .............................................. B29C 43/04
(52) U.S. Cl. ........................ 425/186; 425/234; 425/338; 425/415; 425/451; 100/194; 100/208
(58) Field of Search ............................ 425/338, 450.1, 425/451, 415, 588, 186, 234; 100/193, 194, 196, 199, 207, 208

(56) References Cited

U.S. PATENT DOCUMENTS

| | | | | |
|---|---|---|---|---|
| 1,291,637 A | * | 1/1919 | Burkhardt | ................... 425/338 |
| 2,831,213 A | * | 4/1958 | Klarmann et al. | ........... 425/339 |
| 3,810,730 A | * | 5/1974 | Carlsson | ...................... 425/338 |
| 4,391,577 A | * | 7/1983 | Molina Bonillo | ........... 425/338 |
| 4,726,753 A | * | 2/1988 | Gaigl | ........................... 425/186 |
| 6,227,835 B1 | * | 5/2001 | Bazzica | ....................... 425/338 |

FOREIGN PATENT DOCUMENTS

JP                 015496             1/2000

* cited by examiner

Primary Examiner—Robert Davis
Assistant Examiner—Thu Khanh T. Nguyen
(74) Attorney, Agent, or Firm—Dennison, Schultz, Dougherty & MacDonald (57) ABSTRACT

Press molding apparatus may include a plurality of pairs of forming molds each having an upper mold and a lower mold. The forming molds may be arranged in series in the same direction as their respective mold closing/opening directions. Further, the upper mold or the lower mold of at least one pair of forming molds can transversely move from the respective mold closing/opening positions.

7 Claims, 11 Drawing Sheets

PRESS MOLDING APPARATUS

BACKGROUND OF THE INVENTION

1. Field of the Invention

The present invention relates to press molding apparatus, which may be utilized to perform a work operation on a workpiece. More particularly, the press molding apparatus may include a plurality of substantially vertically disposed molds that may be closed (squeezed together) using a single hydraulic cylinder.

2. Description of Related Art

Japanese Laid-open Patent Publication No. 2000-15496 discloses a known press molding apparatus having a plurality of forming molds. Each forming mold includes an upper and lower mold that are disposed vertically in series and a single hydraulic cylinder opens and closes the respective forming molds. Further, a variety of different pressing operations (e.g., boring, bending and drawing operations) can be simultaneously performed on the respective workpieces disposed in the respective forming molds. In addition, the respective workpieces are manually placed in or removed from the respective forming molds. However, if the known press molding apparatus is utilized for mass production, an automatic transfer machine, such as a robot, may be used. Thus, this known press molding apparatus reduces installation space and can be operated using a relatively low output power source.

SUMMARY OF THE INVENTION

It is, accordingly, one object of the present invention to provide improved press molding apparatus.

In one embodiment of the present teachings, a press molding apparatus may include a plurality of pairs of forming molds each having an upper mold and a lower mold. The forming molds may be arranged or disposed substantially in series in the same direction as the closing/opening direction of the respective forming molds. For example, the plurality of forming molds may be disposed, e.g., vertically in series or horizontally in series. Further, at least one of the upper mold or the lower mold of at least one pair of forming molds preferably can move transversely from the mold closing/opening position, so as to facilitate insertion and removal of the workpieces from the forming molds.

Thus, the workpieces can be placed in and removed from the upper molds and the lower molds by shifting either the upper mold or the lower mold from the mold closing/opening positions. Thus, setting and removal of the workpieces can be facilitated without enlarging or increasing the degree of the mold opening. As a result, the height of the press molding apparatus may be relatively compact. Moreover, the molding opening can be made relatively small so that the press stroke can be shortened and thereby shorten the working cycle. As a result, operation costs for performing the pressing operations can be reduced.

In another embodiment of the present teachings, an automatic transfer means, such as a robot, may be utilized to insert and remove the workpieces into and out of the forming molds. Thus, in this embodiment, the manufacturing operation is facilitated and simplified.

Additional objects, features and advantages of the present invention will be readily understood after reading the following detailed description together with the accompanying drawings and the claims.

DETAILED DESCRIPTION OF THE INVENTION

In another embodiment of the present teachings, an apparatus may include a first mold comprising a first upper mold and a first lower mold, the first mold having an opening/closing direction. A second mold also may be provided and may include a second upper mold and a second lower mold, the second mold also having an opening/closing direction. The first and second molds may be disposed such that their respective opening/closing directions are aligned. Further, at least the second lower mold can move or slide transversely with respect to the second upper mold from the opening/closing position, so as to facilitate insertion and removal of workpieces from the second mold.

In another embodiment, the first lower mold also may move or slide transversely with respect to the first upper mold from the opening/closing position, so as to facilitate insertion and removal of workpieces from the first mold. In this embodiment, the second lower mold optionally may transversely move a greater distance than the first lower mold. Further, guide rails may be provided to support the transverse movement of the first and second lower molds.

A third mold having a third upper mold and a third lower mold also may be provided and the third mold also may have an opening/closing direction. In this case, the first, second and third molds are preferably disposed such that their respective opening/closing directions are aligned. Further, the third lower mold may move transversely with respect to the third upper mold from the opening/closing direction of the third mold. Optionally, the transverse movement distances of the first, second and third lower molds may sequentially increase from the third mold to the first mold. Moreover, a guide rail also may be provided to support the transverse movement of the third lower mold.

A hydraulic cylinder having a cylinder rod may be provided and the cylinder rod may be aligned in the opening/closing direction of the first, second and third molds. In this embodiment, the cylinder rod preferably opens and closes the first, second and third molds upon actuation of the hydraulic cylinder. For example, at least one guide pin may be provided to support movement of the first, second and third molds in the mold opening/closing direction.

A first air cylinder having a first cylinder rod may be provided and the first cylinder rod may be aligned transversely to the opening/closing direction of the first, second and third molds. In this embodiment, the first cylinder rod preferably moves at least the second lower mold transversely to the second upper mold when the second mold is in the mold open position. Naturally, the first cylinder rod also may be designed to move the first lower mold (and/or the third lower mold) transversely to the first upper mold (and/or the third lower mold) when the first mold (and/or the third mold) is in the mold open position.

A second air cylinder having a second cylinder rod may be provided and the second cylinder rod may be aligned transversely to the opening/closing direction of the third mold. In this embodiment, the second cylinder rod may be utilized to move at least the third lower mold transversely to the third upper mold when the third mold is in the mold open position.

The first cylinder may include an arm that extends substantially perpendicularly from the first cylinder rod. Further, at least the first and second lower molds may include respective cam holes and the arm may extend through cam holes defined in at least the respective first and second lower molds. In this case, movement of the arm preferably causes the respective first and second lower molds to move transversely to the respective first and second upper molds. Optionally, the respective cam holes defined in the respective first and second lower molds may be different lengths.

In another embodiment of the present teachings, means for automatically transferring workpieces to and from at least the first and second molds may be provided in order to facilitate removal of finished workpieces from at least the first and second molds. Preferably, at least the first and second lower molds are moved transversely to the respective first and second upper molds from their respective opening/closing positions before the workpieces are removed from the first and second molds.

Each of the additional features and method steps disclosed above and below may be utilized separately or in conjunction with other features and method steps to provide improved press molding apparatus and methods for designing and using such press molding apparatus. Representative examples of the present invention, which examples utilize many of these additional features and method steps in conjunction, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detail description may not be necessary to practice the invention in the broadest sense, and are instead taught merely to particularly describe representative examples of the invention. Moreover, various features of the representative examples and dependent claims may be combined in ways that are not specifically enumerated in order to provide additional useful embodiments of the present teachings.

Figure 1:
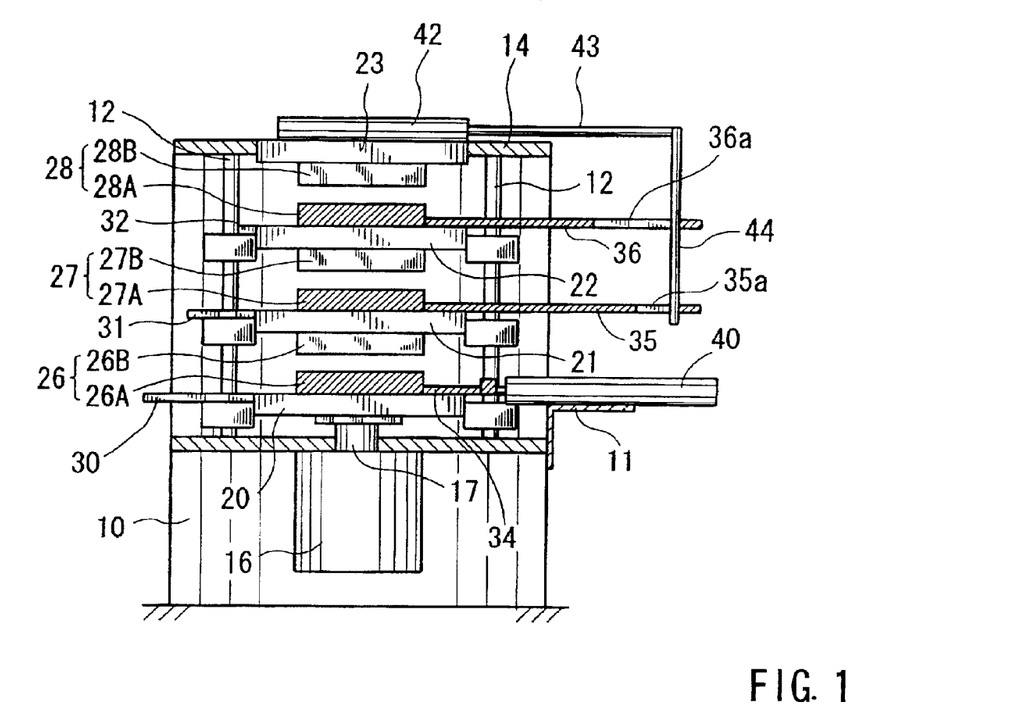
FIG. 1 is a schematic view showing a press molding apparatus according to a first representative embodiment.
Figure 2:
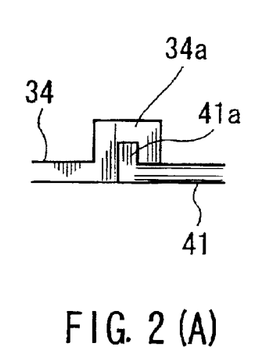
FIG. 2A is a schematic view showing a rod of a first air cylinder engaged with a joint portion of a lower mold.
FIG. 2B is a schematic view showing the rod of the first air cylinder disengaged from the joint portion of the lower mold.

The first representative embodiment of the present teachings will be described with reference to FIGS. 1 to 11. For example, FIG. 1 shows a press molding apparatus having a plurality of (e.g., three) pairs of forming molds disposed vertically in an open state. The press molding apparatus also includes a base frame 10 and an upper frame 14. Four vertically extending guide pins 12 may be disposed between the base frame 10 and the upper frame 14. These guide pins 12 may be disposed, for example, at the four corners of the frames 10 and 14. Further, a hydraulic cylinder 16 may extend upwardly from the lower face of the base frame 10 and may serve as a drive source for the press molding operations.

The press molding apparatus may include three die plates 20–22 (e.g., a drive die plate 20 and driven die plates 21 and 22), which are respectively guided to rise and fall by the respective guide pins 12. One stationary or fixed die plate 23 may be provided at the top of the apparatus. In addition, forming molds 26–28 may be interposed between the respective plates 20–23. In other words, the forming molds 26–28 may be arranged vertically in series with respect to their respective mold closing/opening directions. The drive die plate 20 is preferably located at the lowermost stage or position and is joined to the leading or upward end portion of a cylinder rod 17 that extends from the hydraulic cylinder 16. The drive die plate 20 is preferably driven upward and downward by actuation of the hydraulic cylinder 16.

On the other hand, the stationary die plate 23, which is located at the uppermost stage or position, is preferably fixed to the upper frame 14. The two driven die plates 21 and 22, which are preferably disposed between the drive die plate 20 and the stationary die plate 23, are driven to rise and fall according to the rising and falling motions of the drive die plate 20. The lower positions of these two driven die plates 21 and 22, which lower positions are shown in FIG. 1, may be determined by an appropriate stopper device.

The respective forming molds 26–28 may, e.g., serve as molds for respectively pressing workpiece, so as to perform various operations, such as boring, bending, drawing, etc. The workpiece may be prepared, e.g., by cutting rolled metal sheet into a predetermined shape. Within the lowermost forming mold 26, a lower mold 26A may be fixed to the upper face of the drive die plate 20. Further, an upper mold 26B may be fixed to the lower face of the driven die plate 21. Within the intermediate forming mold 27, a lower mold 27A may be fixed to the upper face of the driven die plate 21. Further, an upper mold 27B may be fixed to the lower face of the driven die plate 22. Within the uppermost forming mold 28, a lower mold 28A may be fixed to the upper face of the driven die plate 22. Further, an upper mold 28B may be fixed to the lower face of the stationary die plate 23. Preferably, these respective forming molds 26–28 can be removed from the respective die plates 20–23 so that they may be replaced or inspected.

The lower molds 26A–28A of the respective forming molds 26–28 are preferably assembled on the respective upper faces of the drive die plate 20 and the driven die plates 21 and 22 so as to move (or slide) leftward from the position shown in FIG. 1. Moreover, the respective die plates 20–22 may include rails 30–32 that extend leftward from the respective end portions, as shown in FIG. 1. The rails 30–32 may serve as guide rails for guiding the lower molds 26A–28A towards positions that are outside of the closing/opening positions of the respective forming molds 26–28. The respective rails 30–32 may include different sized protrusions, such that the lowermost rail 30 may have the largest protrusion and the uppermost rail 32 may have the smallest protrusion. Moreover, the stroke lengths of the respective lower molds 26A–28A may be set according to the size of the protrusions of the respective rails 30–32. Thus, the stroke lengths may sequentially increase from the upper stage to the lower stage.

The respective lower molds 26A–28A may also include respective joint members 34–36, which extend rightward as shown in FIG. 1. The end portion of the joint member 34 in the lower mold 26A may include a joint portion 34a having the shape shown in FIGS. 2A and 2B. Moreover, the respective joint members 35 and 36 of the lower molds 27A and 28A may have a flat plate shape and cam holes 35a and 36a may be formed or defined near the respective end portions of the respective joint members 35 and 36. In the present representative embodiment, the two cam holes 35a and 36a are disposed in different positions. For example, the cam hole 36a may be offset leftward from the cam hole 35a.

A bracket 11 preferably serves to support a first air cylinder 40 on the base frame 10. Similarly, a second air cylinder 42 may be mounted on or supported by the upper frame 14 (or the stationary die plate 23).

This first air cylinder 40 may be arranged in the leftward position such that the leading end portion of its cylinder rod 41 includes a joint portion 41a that will be connected to the joint portion 34a of the joint member 34, as shown in FIGS. 2A and 2B. Referring to FIG. 2A, the joint portions 34a and 41a may engage each other when the press molding apparatus is in the open mold state. Further, referring to FIG. 2B, the joint portions 34a and 41a may be disengaged when the drive die plate 20 (or the lower mold 26A) is raised during the closing operation. In addition, the second air cylinder 42 may extend in the rightward direction as shown in FIG. 1, such that a downward-extending arm 44 is fixed to the leading end portion of the cylinder rod 43 of the second air cylinder 42. The arm 44 may be downwardly inserted through the respective cam holes 35a and 36a of the joint members 35 and 36.

A representative method for operating the first representative press molding apparatus will be described with reference to FIGS. 3 to 11. In these figures, only the components that are required to describe the respective steps are shown for the purpose of illustration and clarity.

Figure 3:
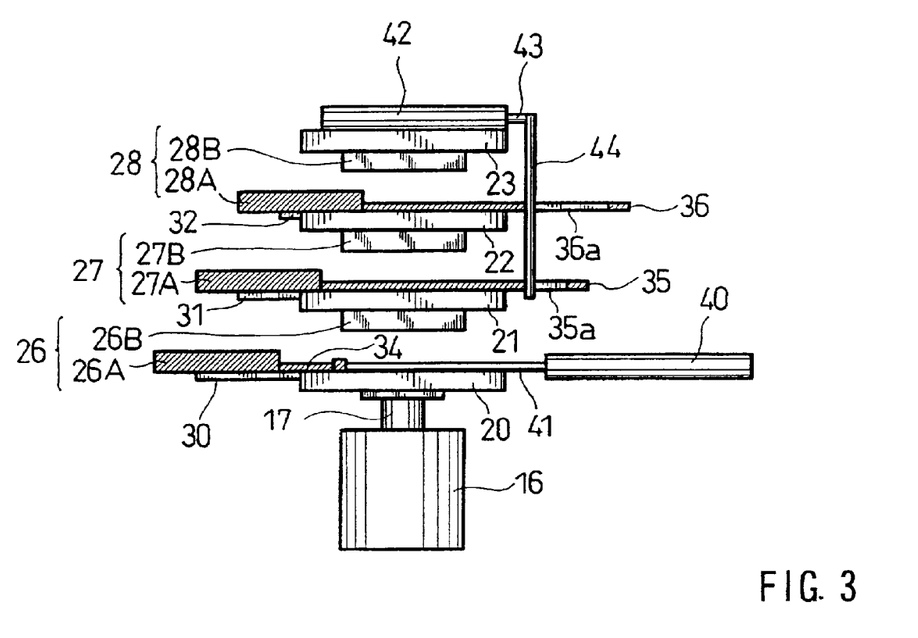
FIGS. 3 to 11 are explanatory views showing a series of steps that can be performed by the first representative press molding apparatus.

First, the mold open state of the respective forming molds 26–28 will be described as shown in FIG. 3. For example, the cylinder rod 41 of the first air cylinder 40 may pushed or extended to its full stroke length and the cylinder rod 43 is completely retracted or withdrawn into the second air cylinder 42. In this case, the respective lower molds 26A–28A will moved from the mold closing/opening positions (or the confronting positions) to the front working positions (or the non-confronting positions) of the first representative embodiment. However, the press molding apparatus is not started in this state. As was described above, the stroke lengths of the lower molds 26A–28A (i.e., the protrusions towards the front face side) are the largest at the lowermost stage and the smallest at the uppermost stage. In this state, workpieces are placed or disposed on the respective lower molds 26A–28A. The detailed procedures for working or transforming the workpieces will be further described below.

Figure 4:
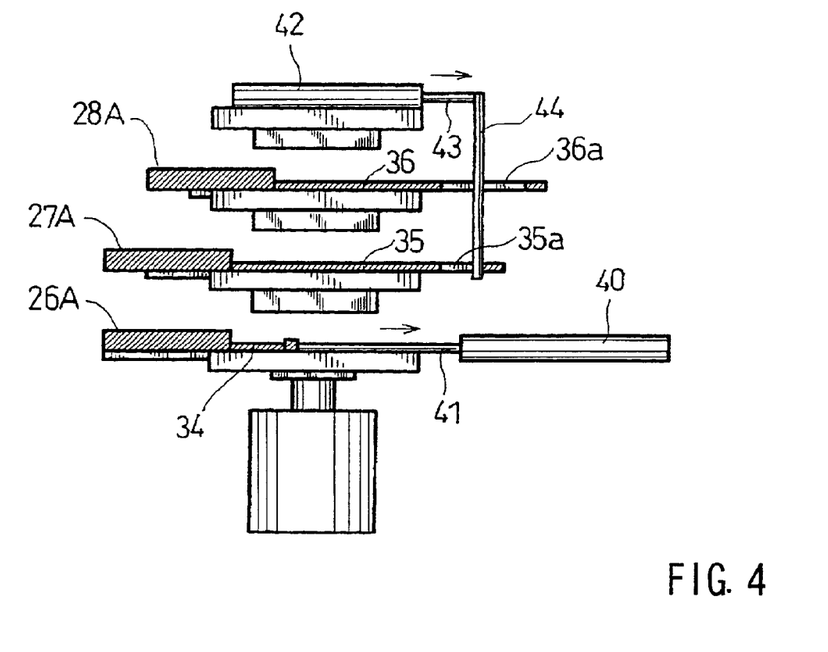
Figure 5:
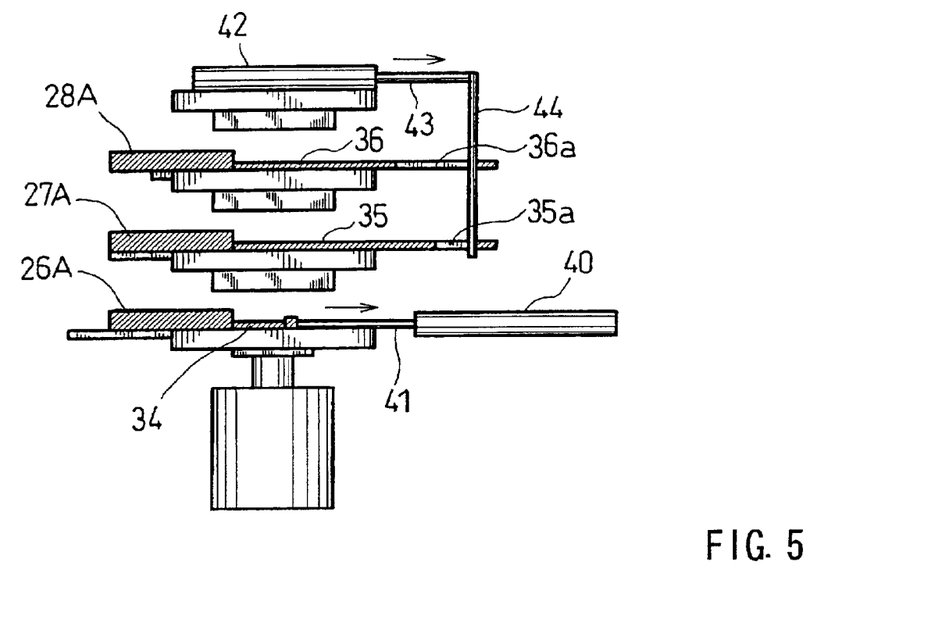
Figure 6:
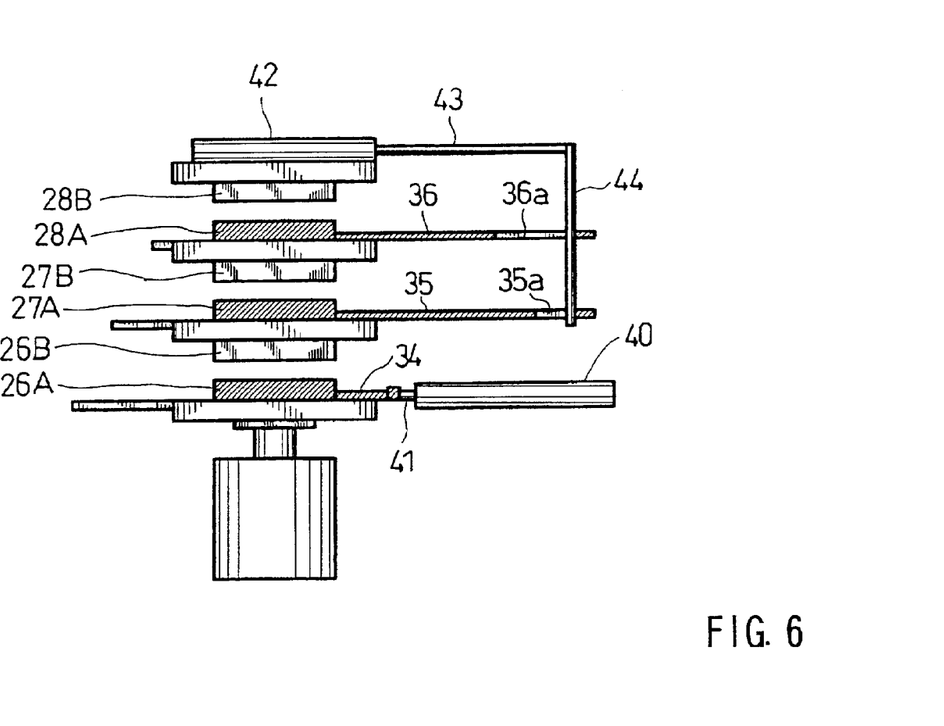

When the start switch of the press molding apparatus is actuated, the first air cylinder 40 and the second air cylinder 42 simultaneously begin to operate. FIGS. 4 to 6 show the motions from the time when the start switch was actuated to the time just before the pressing operations are begun. As the cylinder rod 41 is withdrawn or retracted into the first air cylinder 40, the lowermost lower mold 26A moves toward the mold closing/opening position. Further, when the cylinder rod 43 is extended from the second air cylinder 42, the arm 44 will move within the cam holes 35a and 36a. However, the lower molds 27A and 28A at the intermediate and uppermost stages will not move (FIG. 4).

As further shown in FIG. 4, the lowermost lower mold 26A is withdrawn or retracted to the same position as the intermediate lower mold 27A. Further, the arm 44 abuts against the edge of the cam hole 35a. Therefore, the intermediate lower mold 27A also begins to move due to the actions of the second air cylinder 42. However, the uppermost lower mold 28A has not yet moved. Referring to FIG. 5, both the lower molds 26A and 27A are then withdrawn or retracted to the same position as the uppermost lower mold 28A. Further, the arm 44 abuts against the edge of the cam hole 36a. Thereafter, the uppermost lower mold 28A will also move due to the actions of the second air cylinder 42.

Simultaneous with the complete retraction of the cylinder rod 41 into the first air cylinder 40, the cylinder rod 43 of the second air cylinder 42 is extended to its full stroke length. Therefore, the respective lower molds 26A–28A are returned to the confronting positions of the respective upper molds 26B to 28B, i.e., the mold closing/opening positions. Thereafter, the molds are closed for the respective pressing operations. The respective lower molds 26A–28A may be returned to the positions shown in FIG. 6 just before the molds are closed. In that case, the return operation is not required to be timed with the actions of the first air cylinder 40 and the second air cylinder 42.

Figure 7:
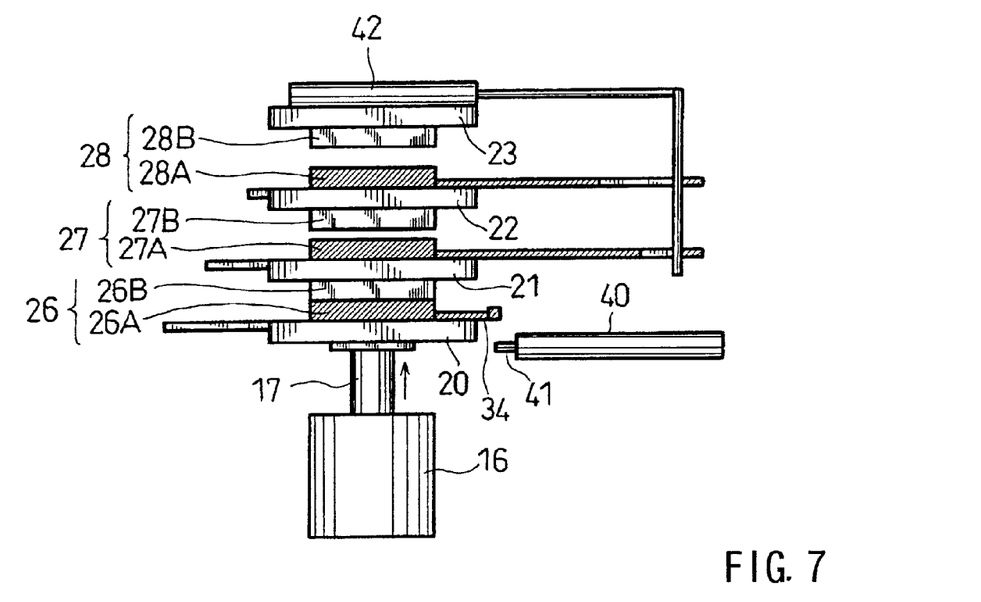

FIG. 7 shows the state just after the molds have begun to close. At this time, the hydraulic cylinder 16 pushes (or applies pressure to) the drive die plate 20. Thus, the lower mold 26A will begin to contact the upper mold 26B so as to slightly raise the driven die plate 21. Naturally, when the drive die plate 20 rises, the respective joint portions 34a and 41a of the joint member 34 of the lower mold 26A and the cylinder rod 41 of the first air cylinder 40 are disengaged, as shown in FIG. 2B. Consequently, the drive die plate 20 can freely move upwardly.

As the drive die plate 20 continues to rise, the lower mold 27A contacts the upper mold 27B in the intermediate forming mold 27, thereby also raising the driven die plate 22. Furthermore, after the lower mold 28A finally contacts the upper mold 28B of the uppermost forming mold 28, the hydraulic cylinder 16 applies a compressive force to the die plates 20–22 and the stationary die plate 23. Thus, the pressing operations are performed within the respective forming molds 26–28.

Figure 8:
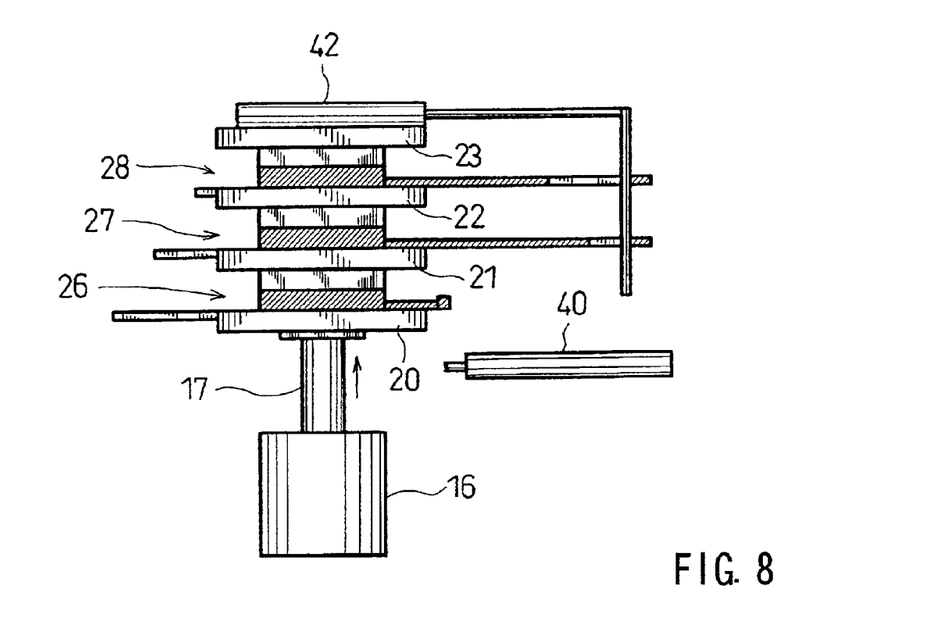

FIG. 8 shows a representative pressing operation in which each of the respective molds 26–28 are closed in the mold closed position. When the pressing operation is completed, the hydraulic cylinder 16 lowers the drive die plate 20. As a result, the driven die plates 21–22 follow the drive die plate 20 and are also lowered. Therefore, the respective forming molds 26–28 return to the open mold state shown in FIG. 1.

Naturally, the driven die plates 21 and 22 will rise and fall relative to the arm 44. However, the arm 44 and the cam holes 35a and 36a are maintained in separate position so as to avoid interfering with each other in the vertical direction. Therefore, no load is exerted upon the cylinder rod 43 or the arm 44 of the second air cylinder 42 during the mold opening and closing operations.

Figure 9:
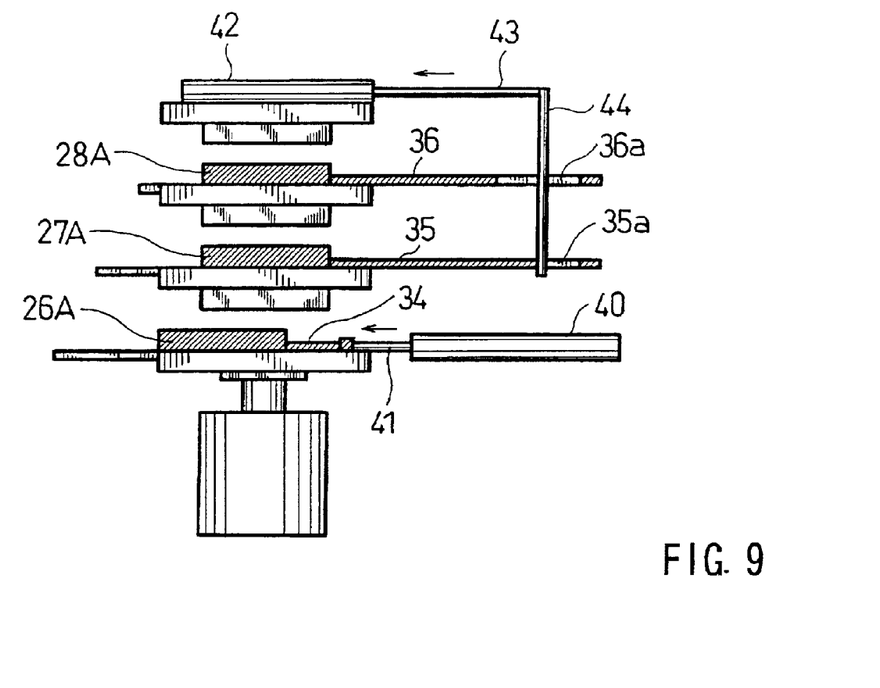
Figure 10:
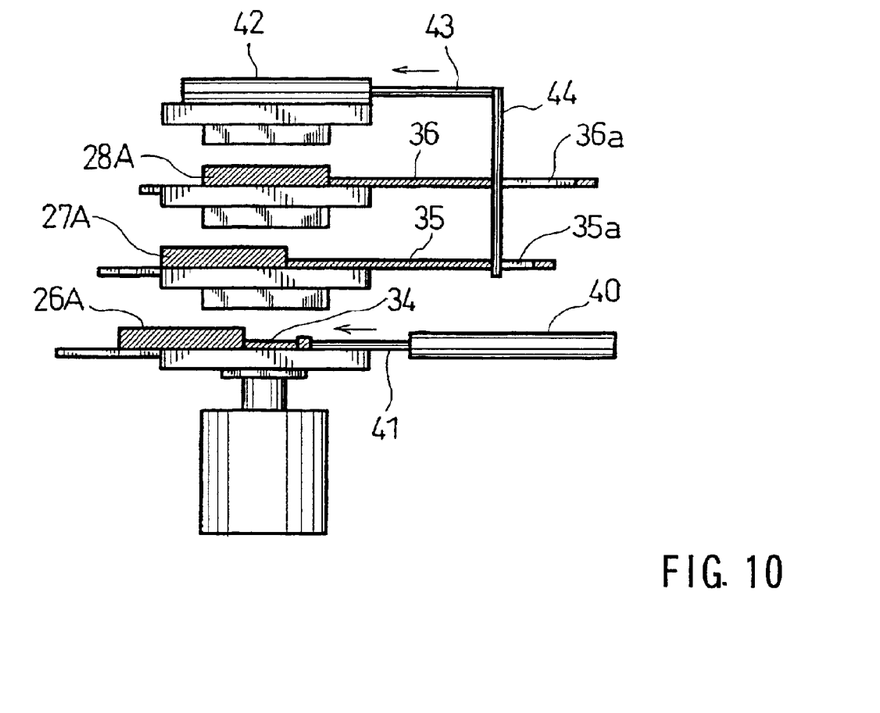
Figure 11:
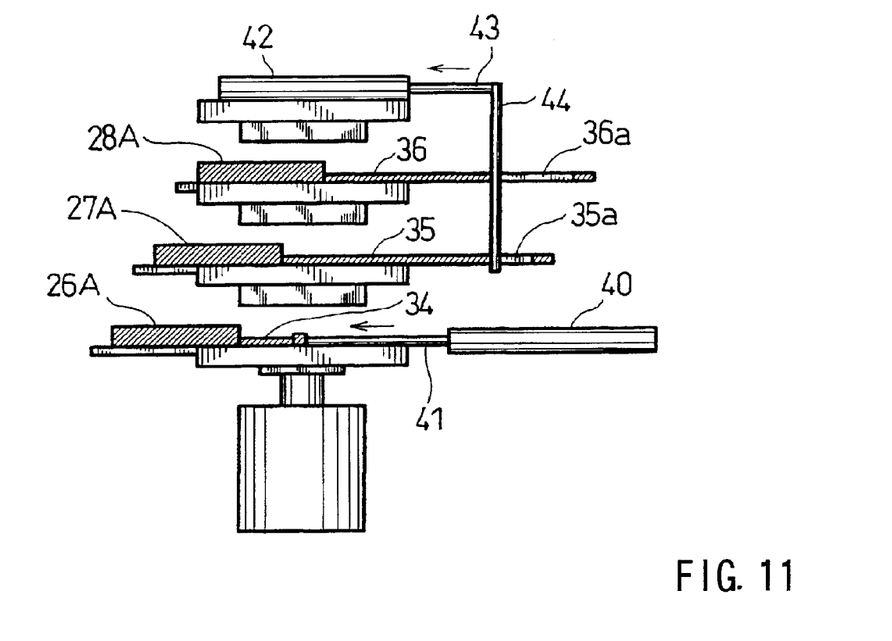

When the cylinder rod 41 of the first air cylinder 40 is extended in the open mold state shown in FIG. 1, the lowermost lower mold 26A begins to move. Simultaneously, the cylinder rod 43 of the second air cylinder 42 is retracted or withdrawn. However, because the arm 44 is only moving within the cam holes 35a and 36a at this time, the intermediate and uppermost lower molds 27A and 28A do not move yet, as shown in FIG. 9. As the cylinder rod 43 is further withdrawn or retracted into the second air cylinder 42, the arm 44 will abut against the edge of the cam hole 35a in order to begin moving the intermediate lower mold 27A. As shown in FIG. 10, the arm 44 will also abut against the edge of the cam hole 36a in order to also begin moving the uppermost lower mold 28A. Thereafter, the respective lower molds 26A–28A move together, as shown in FIG. 11, in order to return to the state shown in FIG. 3.

When the first representative embodiment is in the state shown in FIG. 3, workpieces can be placed in or removed from the respective lower molds 26A–28A. In this embodiment, the workpieces are manually moved. Thus, the molded workpiece may first be removed from the lowermost lower mold 26A and transferred to another mold. For example, the workpiece disposed in the intermediate lower mold 27A may be placed in the lowermost lower mold 26A and the workpiece disposed in the uppermost lower mold 28A may be placed in the intermediate lower mold 27A. Then, a new workpiece may be placed in the uppermost lower mold 28A. By moving the workpieces sequentially downward in this manner, the amount of manual labor required to sequentially move the respective workpieces can be reduced. Moreover, the load on the machine can be reduced if, for example, an automatic transfer machine, such as a robot, is utilized to move the workpieces.

When the first representative embodiment is disposed in the open mold state, the respective forming molds 26–28 are designed so that the respective lower molds 26A–28A are positioned away from the upper molds 26B–28B. That is, the respective lower molds 26A–28A are preferably not disposed direction underneath the respective upper molds 26B–28B. Further, the respective lower molds 26A–27A disposed at the lowermost stages protrude more than the lower mold 28A disposed at the uppermost stage. Therefore, wide working spaces are provided for the respective lower molds. As a result, the workpieces can be easily set on and removed from the respective lower molds 26A–28A, even if the opening position of the respective forming mold is relatively small. Consequently, the overall height of the press molding em apparatus can be minimized. Moreover, the press stroke length can be shortened, thereby reducing the cost of the hydraulic cylinder 16 and the operating costs.

A second representative embodiment will now be described with reference to FIGS. 12–22. Non-essential components have been omitted from these FIGS. 12–22 for the purposes of clarity and illustration. Further, the second representative embodiment primarily differs from the first representative embodiment in that the workpieces are automatically transferred to and from the press mold apparatus. In addition, servo motors may optionally be utilized to move the respective lower molds. However, the remaining features and functions of the second representative embodiment are substantially identical to the first representative embodiment. Therefore, components having identical or similar functions as the components of the first representative embodiment have been designated with common reference numerals in FIGS. 12–22 and further description of such components will not be repeated.

Figure 12:
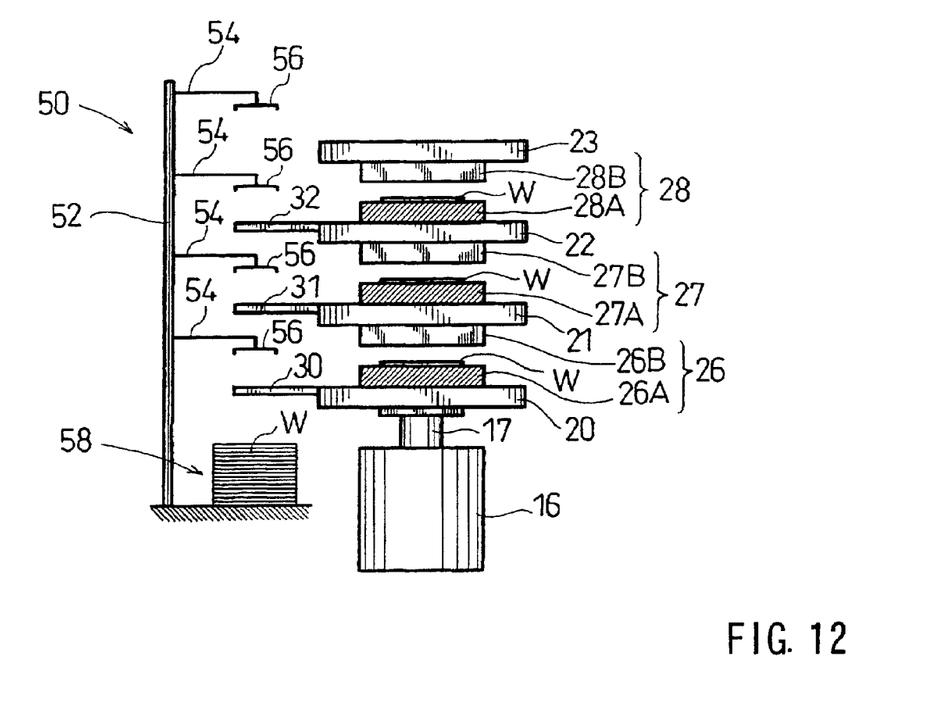
FIG. 12 is a schematic view showing a press molding apparatus according to a second representative embodiment.
Figure 13:
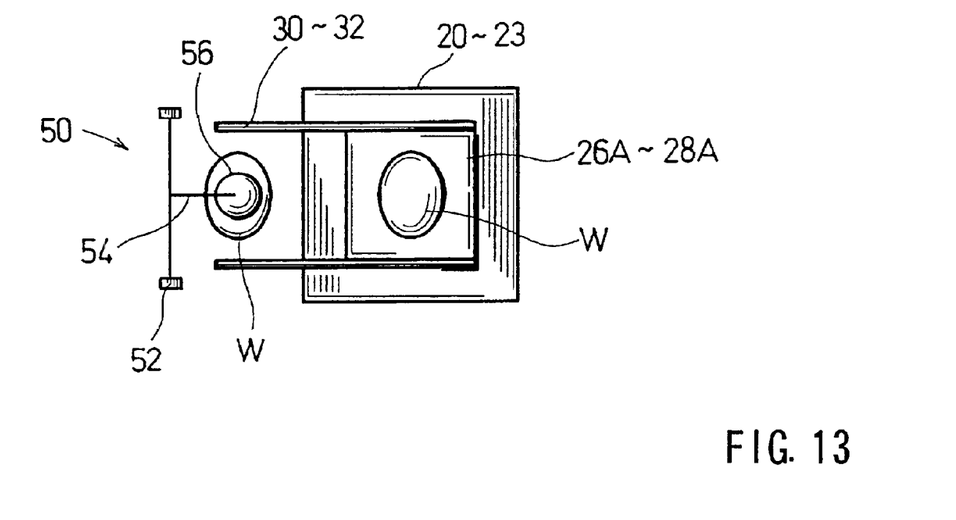
FIG. 13 is a top plan view of FIG. 12.
Figure 14:
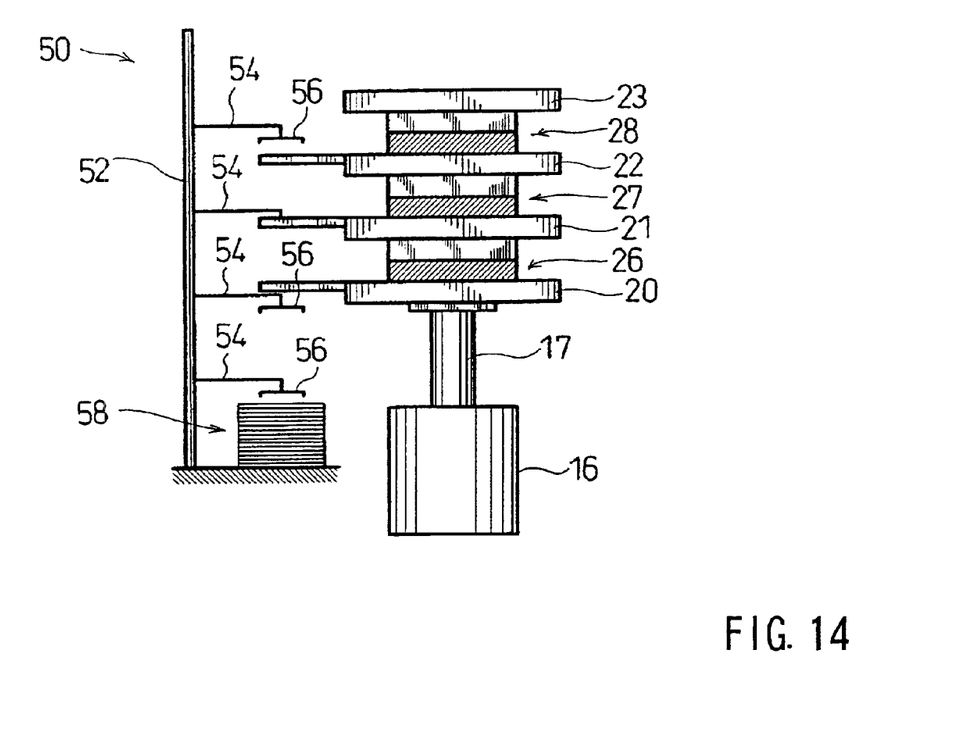
FIGS. 14 to 22 are explanatory views showing a series of steps that can be performed by the second representative press molding apparatus.

As shown in FIGS. 12 and 13, the press molding apparatus is constructed in a similar manner as the first representative embodiment. Thus, three pairs of forming molds 26–28 are arranged vertically in series and are closed/opened by actuation of the hydraulic cylinder 16. Moreover, the lower molds 26A–28A of the respective forming molds 26–28 move or slide transversely along the rails 30–32 with respect to the upper faces of the drive die plate 20 and the driven die plates 21 and 22. Each respective rail 30–32 protrudes from the press molding apparatus by the same distance in this embodiment. Moreover, the respective lower molds 26A–28A are also designed to move or slide equal distances. The drive means for the respective lower molds 26A–28A may optionally include either (1) a combination of a single servo motor and a gear mechanism, or (2) an air cylinder attached to each of the lower molds.

A work transfer device 50 is disposed to one side of the press molding apparatus. This transfer device 50 may include four arms 54 and a vertically extending guide 52 may guide upward and downward movement. The guide 52 is preferably taller than the press molding apparatus, and the respective arms 54 all are driven upward and downward while maintaining a constant spacing between the respective arms 54. Downward-facing suction cups 56 are disposed on the leading ends of each of the respective arms 54. The suction cups 56 are preferably coupled to a suction device or another type of vacuum generating device (not shown) in order to grip or hold the workpieces when the suction device is actuated.

The respective arms 54 move upward and downward between the rails 30–32, as shown in FIG. 13. The upward and downward movements may be driven by a motor, which serves as a drive source, and a transmission mechanism including a timing belt and a timing pulley.

A representative method for operating the press molding apparatus of the second representative embodiment will not be described. FIG. 12 shows the state just before the working operation will begin. Respective workpieces W are first placed on the lower molds 26A–28A of the respective forming molds 26–28. Then, the hydraulic cylinder 16 is driven to close the molds (FIG. 14) of the press molding apparatus in a manner similar to the first representative embodiment described above. Thus, the respective pressing operations are performed by each of the respective forming molds 26–28. While the press molding apparatus is being closed from the opened mold state, the respective arms 54 of the transfer device 50 are lowered to the positions shown in FIG. 14. Naturally, at this time, the respective arms 54 do not hold any workpieces.

Figure 15:
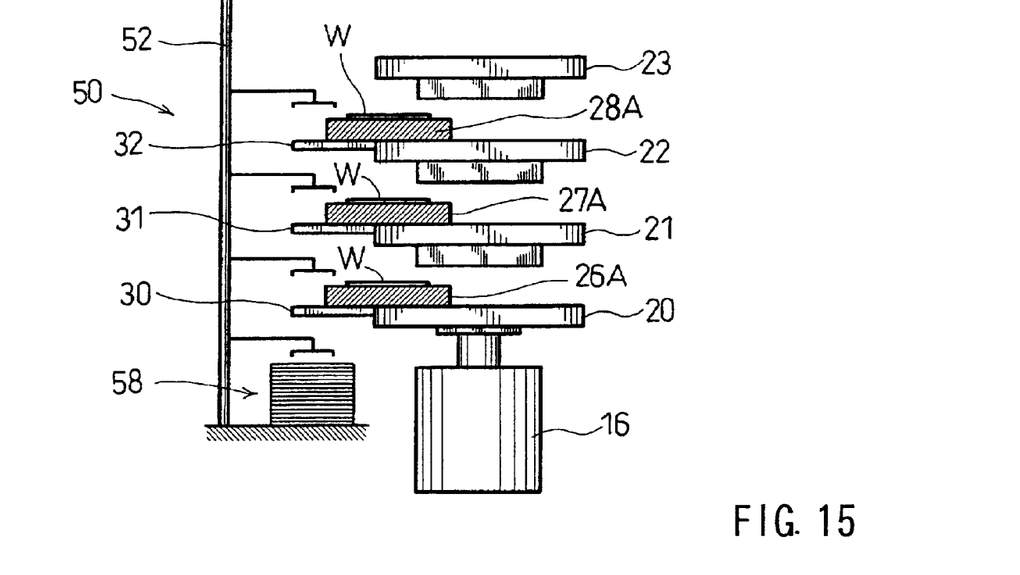
Figure 16:
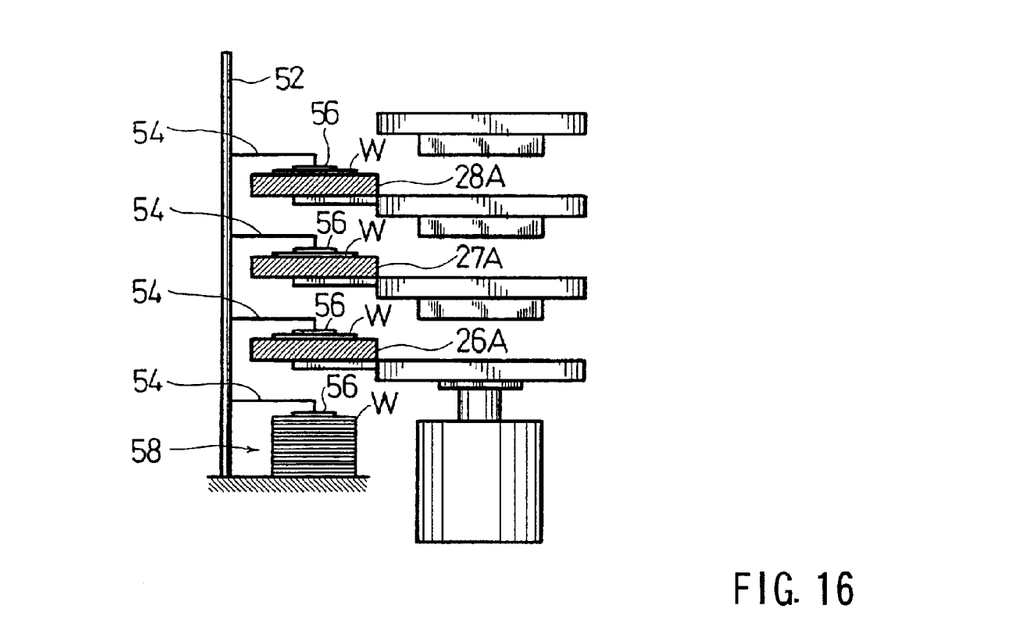
Figure 17:
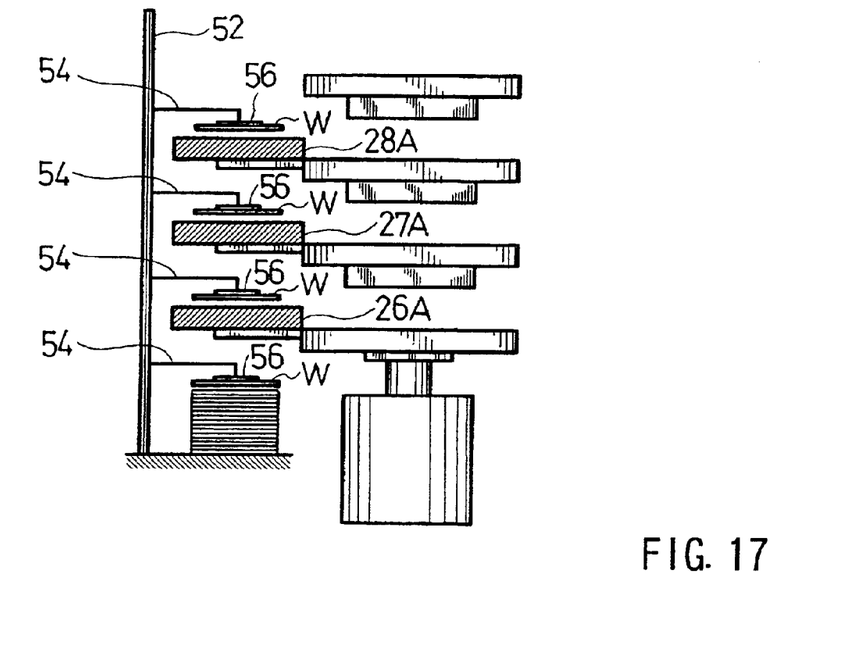

As shown in FIG. 15, the press molding apparatus is then opened again by lowering the hydraulic cylinder 16 after the pressing operation has been completed. Then, each of the respective lower molds 26A–28A are moved transversely (e.g., horizontally) with respect to the press molding apparatus. After the respective lower molds 26A–28A have reached their outermost positions (i.e., positions closest to the transfer device 50 as shown in FIG. 16), the respective arms 54 are slightly moved downward. As a result, the suction cups 56 of the three upper arms 54 contact the workpieces W disposed on the lower molds 26A–28A.

When the suction cup 56 of the lowermost arm 54 contacts a new workpiece W disposed in a storage space 58, the respective suction cups 56 are coupled to the suction device in order to attach the respective workpieces W to the arms 54. Thereafter, the respective arms 54 are raised to the positions shown in FIG. 17, which positions correspond to the positions shown in FIG. 15. Preferably, the uppermost workpiece W (or the new material) that is stacked in the storage space 58 is always maintained at a predetermined level or height by a spring or air cylinder.

Figure 18:
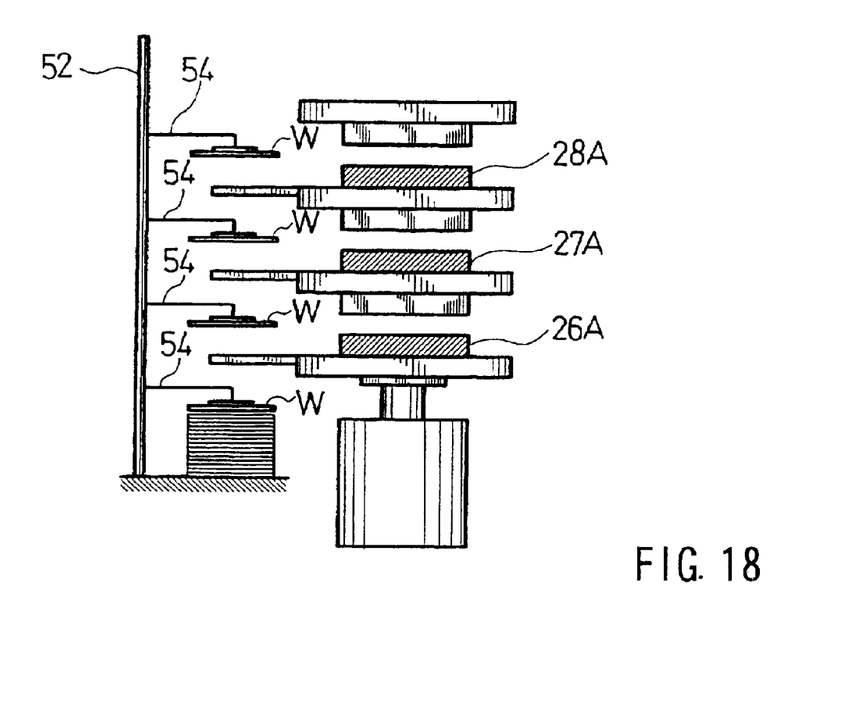
Figure 19:
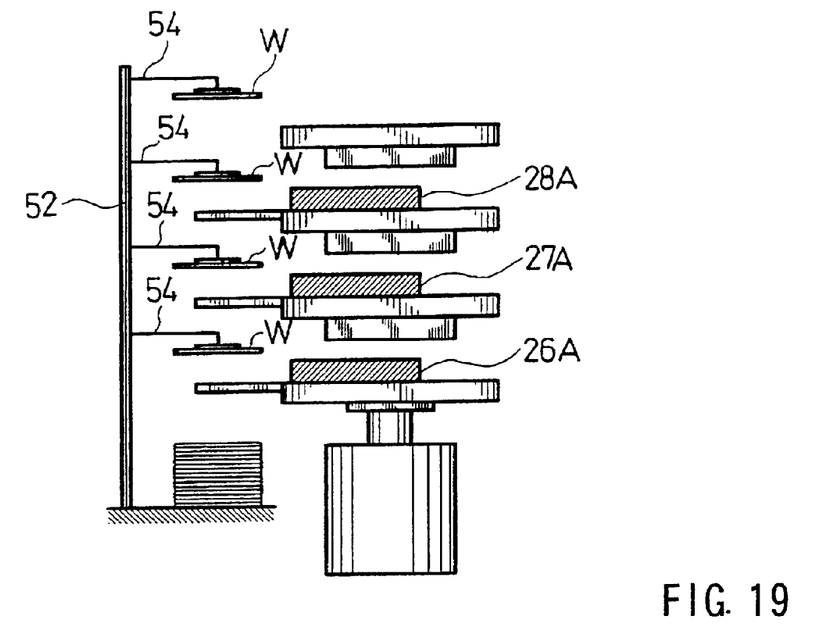
Figure 20:
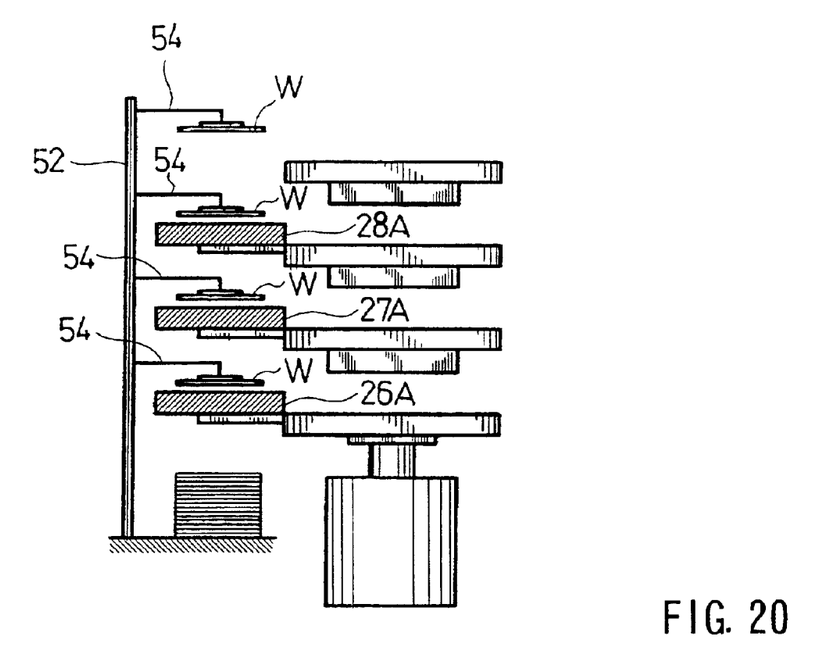
Figure 21:
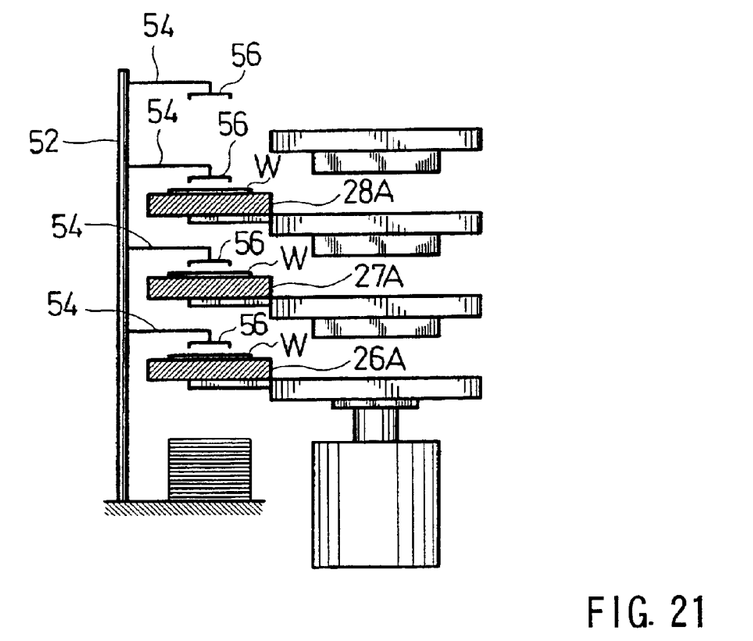

As shown in FIG. 18, the respective lower molds 26A–28A are then returned to their initial positions (i.e., the positions directly underneath the respective upper molds 26B–28B). As shown in FIG. 19, the respective arms 54 are then raised, while holding the workpieces K, to the same positions shown in FIG. 12. While raising the arms 54, the respective lower molds 26A–28A are moved again toward the transfer device 50, as shown in FIG. 19. When the respective lower molds 26A–28A are moved to the positions closest to the transfer device 50, as shown in FIG. 20, the suction device is de-activated and the respective suction cups 56 release the respective workpieces W. Thus, as shown in FIG. 21, the respective workpieces W are each moved to a lower mold (26A–27A). Further, the topmost workpiece W is preferably released to a conveyor device (not shown) or other device for transferring the finished workpiece W away from the press molding apparatus.

The transfer device 50 then selects the topmost workpiece W from the storage space 58 and places the new workpiece W on the lowermost lower mold 26A. The workpiece W from the lowermost lower mold 26A is then placed on the intermediate lower mold 27A. Moreover, the workpiece W from the intermediate lower mold 26A is then placed on the uppermost lower mold 27A. As noted above, the molded work W from the uppermost lower mold 28A is removed from the uppermost lower mold 28A for further processing.

Figure 22:
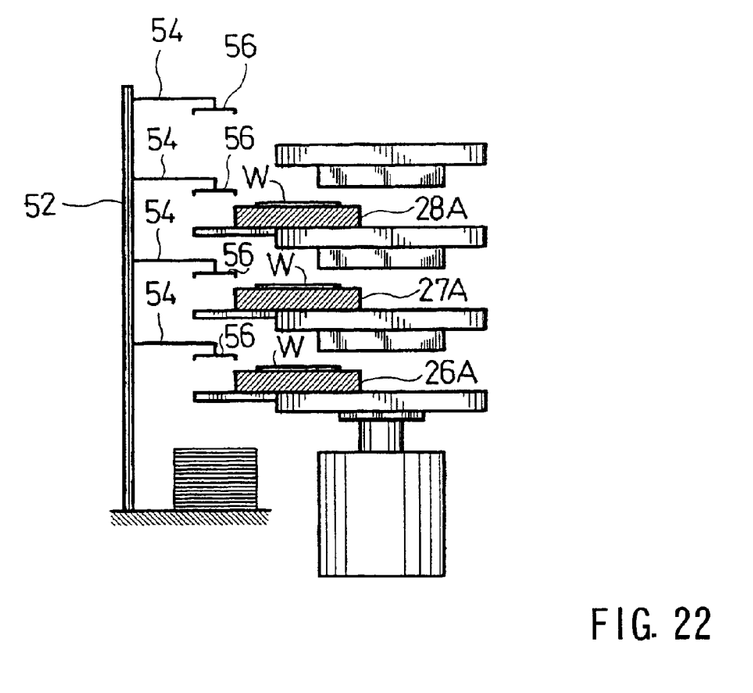

When the workpieces W are set or placed on the respective lower molds 26A–28A, the lower molds 26A–28A are all moved together toward the respective initial positions, as shown in FIG. 22. Thus, the press molding apparatus is returned to the state shown in FIG. 12 in order to begin the next pressing operation.

In this embodiment, the respective arms 54 of the transfer device 50 can freely move within the relatively wide spaces between the respective lower molds 26A–28A (i.e., when the respective lower molds 26A–28A are moved transversely away from the upper molds 26B to 28B). Therefore, the positioning tolerances of the respective arms 54 can be relaxed. Moreover, the respective arms 54 can move upward and downward along a substantially one-dimensional path. Therefore, the transfer device 50 may have a relatively inexpensive and simple construction and is well suited for small-sized facilities.

Naturally, the respective arms 54 could also be designed for two-dimensional operations. For example, the respective arms 54 could be designed to move in the same direction as the moving direction of the lower molds 26A–28A. In this case, the operations of the respective lower molds 26A–28A could be reduced from two reciprocal movements to a single reciprocal movement in one cycle of the pressing operation.

Naturally, various modifications can be made to the representative embodiments without departing from the spirit of the present teachings. For example, although the lower molds 26A–28A of the respective forming molds 26–28 move in the representative embodiments, only the lower molds of one set of forming molds is required to move if two sets of upper and lower forming molds are utilized. Moreover, the upper molds 26B to 28B of the forming molds 26–28 could also be made to move so as to maintain the respective spaces over the lower molds 26A–28A.

Further, the first representative embodiment may be modified so that the second air cylinder 42 is also utilized to move the lowermost lower mold 26A. In this case, a cam hole may also be provided in the joint member 34 that receives the arm 44. In the alternative, dedicated air cylinders could be provided for each of the respective lower molds 26A–28A. Moreover, although the respective lower molds 26A–28A of the first representative embodiment move in a predetermined sequence, this moving sequence or timing naturally can be suitably changed.

In addition, although the workpieces W are transferred upward by the transfer device 50 in the second representative embodiment, the transfer direction can of course be reversed. In this case, the storage space 58 could naturally be disposed at an upper position. Furthermore, the first and second representative embodiments could be modified so as to be utilized together. In this case, the transfer means 50 of a first apparatus could be designed to transfer the workpieces W upward and the transfer means 50 of a second apparatus could be designed to transfer the workpieces W downward. If such design is utilized, the feed and delivery of the materials to and from the press molding apparatus could advantageously performed at a relatively low position. Finally, the transfer device 50 naturally could be modified to utilize electromagnets for holding the workpieces W instead of suction cups 56.

What is claimed is:

1. An apparatus comprising:
    a first mold comprising a first upper mold and a first lower mold, the first mold having an opening/closing direction,
    a second mold comprising a second upper mold and a second lower mold, the second mold having an opening/closing direction,
    a third mold comprising a third upper mold and a third lower mold, the third mold having an opening/closing direction
    a first moving means,
    a second moving means,
    wherein the first and second molds are disposed such that their respective opening/closing directions are aligned and the first and second lower molds are arranged and constructed to move or slide transversely with respect to the first and second upper molds from the opening/closing positions, and wherein the first moving means is arranged and constructed to move the first and second lower molds transversely with respect to the first and second upper molds such that transverse movement distances of the first and second lower molds are different from each other,
    wherein the first, second and third molds are disposed such that their respective opening/closing directions are aligned and the third lower mold is arranged and constructed to move transversely with respect to the third upper mold from the opening/closing direction of the third mold, and wherein the second moving means is arranged and constructed to move the third lower mold transversely with respect to the third upper mold such that transverse movement distance of the third lower mold is different from the transverse movement distances of the first and second lower molds, and
    wherein the first moving means comprises a first air cylinder having a first air cylinder rod aligned transversely to the opening/closing direction of the first and second molds, the first air cylinder rod being linked to the first and second lower molds, so as to transversely move the first and second lower molds when the first and second molds are in the mold open positions, and wherein the second moving means comprises a second air cylinder having a second air cylinder rod aligned transversely to the opening/closing direction of the third mold, the second air cylinder rod being linked to the third lower mold, so as to transversely move the third lower mold when the third mold is in the mold open position.

2. An apparatus according to claim 1, wherein the first moving means is arranged and constructed to transversely move the second lower mold such that the transverse movement distance of the second lower mold is greater than the transverse movement distance of the first lower mold.

3. An apparatus according to claim 1, further comprising a hydraulic cylinder having a cylinder rod aligned in the opening/closing direction of the first, second and third molds, wherein the cylinder rod is arranged and constructed to open and close the first, second and third molds upon actuation of the hydraulic cylinder.

4. An apparatus according to claim 1, further comprising means for automatically transferring workpieces to and from the first, second and third molds when the first, second and third lower molds have been moved transversely from their respective opening/closing positions.

5. An apparatus according to claim 1, further comprising at least one guide rail for supporting movement of the first, second and third molds in the mold opening/closing direction.

6. An apparatus according to claim 1, wherein the first moving means further comprises an arm extending substantially perpendicular from the first air cylinder rod, wherein the arm extends through first and second cam holes that are defined in the respective first and second lower molds and have different lengths, and wherein movement of the arm causes the respective first and second lower molds to move transversely to the respective first and second upper molds.

7. An apparatus comprising:

a first mold comprising a first upper mold and a first lower mold, the first mold having an opening/closing direction, a second mold comprising a second upper mold and a second lower mold, the second mold having an opening/closing direction, a first moving means, wherein the first and second molds are disposed such that their respective opening/closing directions are aligned and the first and second lower molds are arranged and constructed to move or slide transversely with respect to the first and second upper molds from the opening/closing positions, and wherein the first moving means is arranged and constructed to move the first and second lower molds transversely with respect to the first and second upper molds such that transverse movement distances of the first and second lower molds are different from each other, wherein the first moving means comprises a first air cylinder having a first air cylinder rod aligned transversely to the opening/closing direction of the first and second molds, the first air cylinder rod being linked to the first and second lower molds, so as to transversely move the first and second lower molds when the first and second molds are in the mold open positions, and wherein the first moving means further comprises an arm extending substantially perpendicular from the first air cylinder rod, wherein the arm extends through first and second cam holes that are defined in the respective first and second lower molds and have different lengths, and wherein movement of the arm causes the respective first and second lower molds to move transversely to the respective first and second upper molds.

* * * * *